US012615348B2

(12) United States Patent
Menon et al.

(10) Patent No.: US 12,615,348 B2
(45) Date of Patent: Apr. 28, 2026

(54) NAVIGATION AND VIEW SHARING SYSTEM FOR REMOTE COLLABORATION

(71) Applicant: Autodesk, Inc., San Francisco, CA (US)

(72) Inventors: Ajay Vijayabalan Menon, Toronto (CA); Sebastien Morel, Montreal (CA); Juan Sebastian Casallas Suarez, San Leandro, CA (US); Brent Scannell, Montreal (CA); Akram Ghoussoub, Montreal (CA); Nicolas Fonta, Montreal (CA)

(73) Assignee: Autodesk, Inc., San Francisco, CA (US)

( * ) Notice: Subject to any disclaimer, the term of this patent is extended or adjusted under 35 U.S.C. 154(b) by 250 days.

(21) Appl. No.: 18/240,646

(22) Filed: Aug. 31, 2023

(65) Prior Publication Data

US 2024/0106984 A1 Mar. 28, 2024

Related U.S. Application Data

(60) Provisional application No. 63/409,656, filed on Sep. 23, 2022.

(30) Foreign Application Priority Data

Aug. 30, 2023 (EP) ..................................... 23194368

(51) Int. Cl.
H04N 7/15 (2006.01)
(52) U.S. Cl.
CPC .................................. H04N 7/157 (2013.01)
(58) Field of Classification Search
CPC .................................................... H04N 7/157
See application file for complete search history.

(56) References Cited

U.S. PATENT DOCUMENTS 6,570,563 B1 5/2003 Honda
6,629,065 B1 9/2003 Gadh et al.
(Continued)

OTHER PUBLICATIONS

Greenberg and Marwood, "Real Time Groupware as a Distributed System: Concurrency Control and its Effect on the Interface," Research Report 94/534/03, Department of Computer Science, University of Calgary, Alberta, Canada, 1994, 12 pages.
(Continued)

*Primary Examiner* — Phung-Hoang J Nguyen
(74) *Attorney, Agent, or Firm* — Fish & Richardson P.C.

(57) ABSTRACT

Methods, systems, and apparatus, including medium-encoded computer program products, for computer aided design of physical structures include: displaying, in an extended reality (XR) environment of an interconnected cross-review collaboration application, a shared three-dimensional (3D) model in a first spatial review mode; receiving, in the XR environment of the interconnected cross-review collaboration application and by a first user, an indication specifying a first location within the shared 3D model, the indication being defined using either 2D data or 3D data associated with the 3D model; and displaying, in the XR environment of the interconnected cross-review collaboration application, a portion of the 3D model in a second one-to-one scale review mode, the portion of the 3D model being displayed from a perspective associated with the specified first location, wherein the first spatial review mode and the second one-to-one scale review mode are interconnected.

19 Claims, 15 Drawing Sheets

500 ⌐

Model manipulation outside
1:1 scale review mode

(56)     References Cited

U.S. PATENT DOCUMENTS

| | | | |
|---|---|---|---|
| 9,256,282 | B2 | 2/2016 | Latta et al. |
| 11,592,896 | B2 | 2/2023 | Paez et al. |
| 2009/0106669 | A1 | 4/2009 | Winkler et al. |
| 2009/0259948 | A1 | 10/2009 | Hamilton, II et al. |
| 2012/0264511 | A1 | 10/2012 | Marsland et al. |
| 2013/0047208 | A1 | 2/2013 | Shuster et al. |
| 2015/0120834 | A1 | 4/2015 | Maheshwari et al. |
| 2019/0088016 | A1* | 3/2019 | Tadros .................. G06T 19/003 |
| 2019/0122442 | A1* | 4/2019 | Chen ..................... G06T 19/006 |
| 2020/0142475 | A1 | 5/2020 | Paez et al. |
| 2020/0402317 | A1* | 12/2020 | Valli ....................... G06T 15/20 |
| 2021/0256261 | A1* | 8/2021 | Wang .................. G02B 27/017 |
| 2023/0056976 | A1* | 2/2023 | Tanner .................... G06T 17/20 |
| 2023/0251705 | A1 | 8/2023 | Paez et al. |

OTHER PUBLICATIONS

Extended European Search Report in European Appln No. EP 23194368, dated Jan. 17, 2024, 8 pages.

* cited by examiner

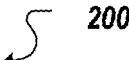

Display, in a virtual reality (VR) environment of a cross-review collaboration application, a shared three-dimensional (3D) model in a first spatial review mode, wherein the first spatial review mode includes presentation of both two-dimensional (2D) and three-dimensional (3D) data of the 3D model 210

Receive, in the VR environment of the cross-review collaboration application and by a first user, an indication specifying a first location within the shared 3D model, the indication being defined using either the 2D data or the 3D data associated with the 3D model 220

Display, in the VR environment of the cross-review collaboration application, a portion of the 3D model in a second one-to-one scale review mode, the portion of the 3D model being displayed from a perspective associated with the specified first location, wherein the first spatial review mode and the second one-to-one scale review mode are interconnected to present at least a portion of the 3D data of the 3D model with different perspectives 230

*FIG. 2A*

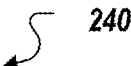

240

Identify network download speed and graphical rendering speed of a computing device 245

↓

Download and render an initial set of data from a three-dimensional computer model in accordance with the network download and graphical rendering speeds, wherein the initial set of data specifies at least an outer shell portion of the three-dimensional computer model 250

↓

Download and render two-dimensional data representing objects in the three-dimensional computer model 255

↓

Receive user input selecting a portion of the two-dimensional data 260

↓

Terminate a currently ongoing download of a remaining set of data from the three-dimensional computer model 265

↓

Download and render a different set of data from the three-dimensional computer model, wherein the different set of data is determined by the user input selecting the portion of the two-dimensional data 270

↓

In response to determining a level of detail to be applied for rendering, defining a set of 2D data to be rendered (e.g., in interactive form allowing the user to determine a different view of the 3D model) 275

FIG. 2B

1:1 scale review streamed into table-top / presentation mode.

440

530

Desk-bound to Spatial mode transition

1:1 scale review mode

540

NAVIGATION AND VIEW SHARING SYSTEM FOR REMOTE COLLABORATION

CROSS-REFERENCE TO RELATED APPLICATIONS

This application claims priority to U.S. Provisional Application No. 63/409,656, filed on Sep. 23, 2022, and claims foreign priority to EP 23194368.9, filed on Aug. 30, 2023. The disclosures of the prior applications are considered part of and are incorporated by reference in the disclosure of this application.

BACKGROUND

This specification relates to collaborative work on a shared document between multiple users. Further, this specification relates to physical model data used in computer graphics applications, such as computer generated animation and/or computer aided design of physical structures and/or other visualization systems and techniques.

SUMMARY

This specification relates to cross-reality collaboration between users interacting with data, including two-dimensional (2D) and three-dimensional (3D) data for projects, such as architectural design projects including construction projects, product manufacturing projects, design projects, e.g., designs of machines, buildings, constructions sites, plants, civil engineering projects, etc.

In some implementations, a cross-reality collaboration platform provides tools and techniques for generating, maintaining, and operating interconnected environments across multiple devices. The interconnected environments can include a virtual reality (VR) environment, an augmented reality (AR) environment, desktop environment, web preview environment, mobile native application environments, among other example environments that can be supported by different types of devices and associated interactive user input devices (e.g., goggles, joy sticks, sensors based interaction supporting tools, pencils, touch pads, gloves, etc.).

By utilizing the interactive techniques and tools supported by the cross-reality collaboration platform, users are able to work independently or in cooperation with other users within the same and/or in different connected environments over one or more projects. Such a cross-reality collaboration platform can support real-time interaction with reduced or eliminated latency when connecting multiple different environments and supporting users to interact cross-device. The interconnection of devices that can be used when working on a common project (e.g., an architectural document, a 3D model, etc.) provides improved user experience while reducing resource expenditures for loading data and optimizing visualization of portions of interconnected data based on user interaction.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 2A shows an example of a process to navigate within 3D model data from different review modes in a cross-reality collaboration setup in accordance with implementations of the present disclosure.

FIG. 2B shows an example of a process to download and render data from a 3D model in accordance with implementations of the present disclosure.

Like reference numbers and designations in the various drawings indicate like elements.

DETAILED DESCRIPTION

Figure 1:
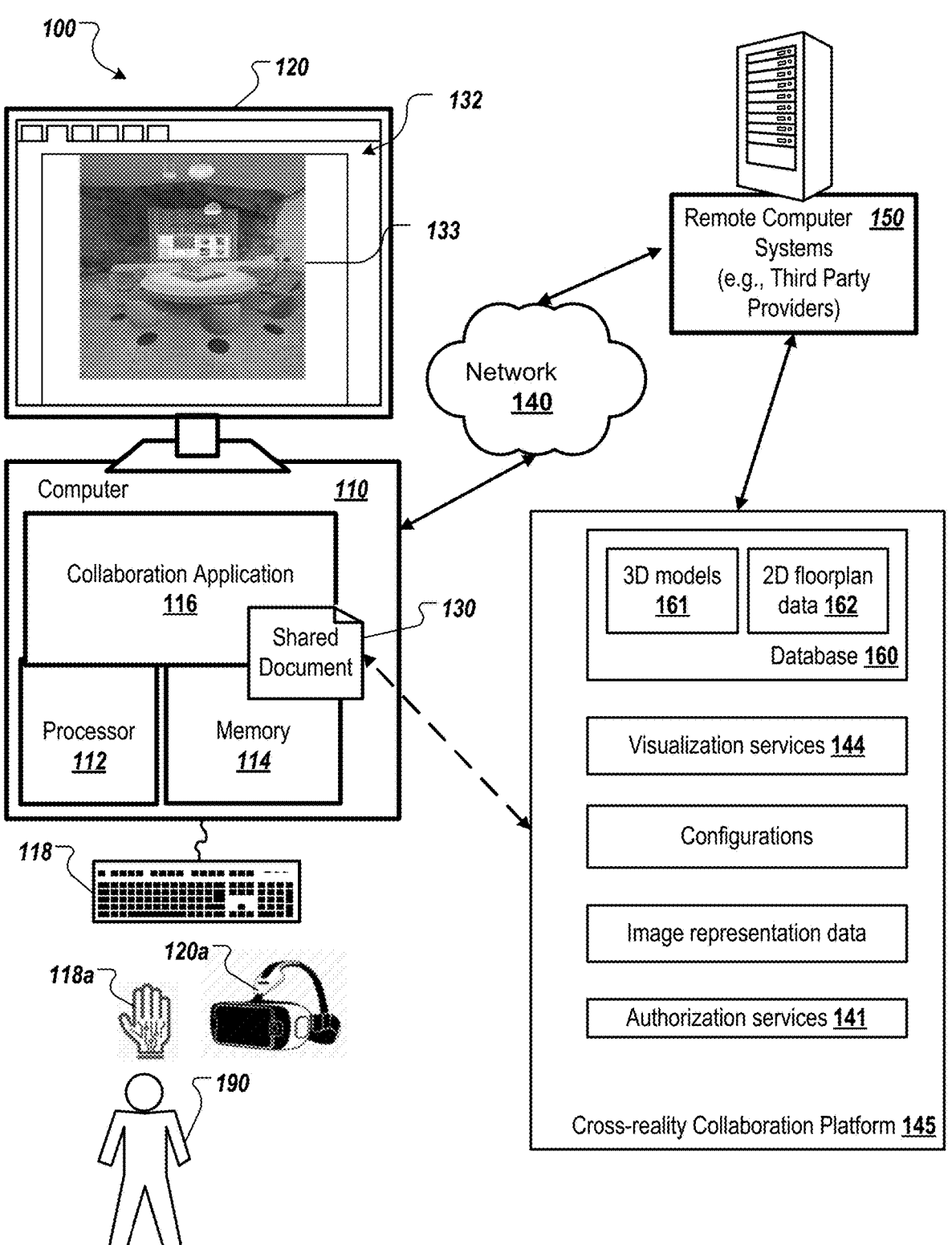
FIG. 1 shows an example of a system usable to support cross-reality collaboration and review sharing between users over a shared document (e.g., computer model(s) of a construction plan for erecting one or more buildings over a specified period of time) in accordance with the implementations of the present disclosure.

The present disclosure describes various tools and techniques for collaboration and view sharing between users when performing editing operations over a shared document. Note that a "document" (e.g., an electronic document) and a "computer model" (e.g., a 2D or 3D model) need not be a single document/model and does not necessarily correspond to a file. A document/model may be stored in a portion of a file that holds other documents/models, in a single file dedicated to the document/model in question, or in multiple coordinated files.

Computer communications and collaboration applications include different software products and/or services that support the work of multiple users in a remote work setup. In some cases, remote users and/or on-site groups of users can work in parallel (or substantially in parallel, or synchronously) over a single document that they view and/or edit to provide a collaborative result. During such collaboration, users can share their display views, participate in video and/or audio conferences, and others that can support work processes such as content creation and decision making, among other examples.

During such collaborative work, users can interact with shared data using different interfaces providing different views of the shared data. In some cases, the shared data can be viewed from different devices or platforms, including desktop devices, tablets, VR and/or AR devices, among other examples. In some implementations, VR and AR devices can be referred to as mixed-reality (MR) or extended-reality (XR) devices. Computer graphics applications include different software products and/or services that support generation of representations of three-dimensional (3D) objects that can be used for visualization object models, for animation and video rendering, etc. Computer graphics applications also include computer animation programs and video production applications that generate 3D representations of objects and views during collaborative user reviews. 3D computer animations can be created in a variety of scenarios and in the context of different technologies. For example, 3D models of objects such as manufacturing sites, buildings, physical constructions, can be animated for display on user interfaces of native devices applications, web application, VR applications, AR applications, among other examples. Prototyping models of objects can be performed in different environments, including a VR environment and based on VR technologies, an AR environment, display user interface, remote video streaming, among others.

Mixed-focus collaboration is a key to work processes such as brainstorming, design reviews, complex content creation, decision making, manufacturing scripts, and others. In some implementations, when users interact over a shared document, such as a 3D model, during a cross-reality collaboration interaction supported by various environments accessed through different devices, they rely on tools to collaboratively interact with the shared document to achieve a common goal (e.g., a particular, new/revised version of the shared document). The cross-reality collaboration can include a video conference call, an audio conference call, or a video and audio conference call, a virtual and/or augmented reality collaborative interactive environment, or combination thereof.

In some instances, one user may participate in a VR interactive session, another user may connect to the VR interactive session via accessing a conference call over an audio connection (e.g., relying only on audio tools (e.g., speaker and/or audio receiver) and setup to interact with the other users), another user may participate over a video and audio connection (e.g., relying on a video and audio tools and setup to interact) where the user may receive real-time streaming of the VR interactive session, and yet another user may participate only over a video connection (e.g., relying only on a video tool and setup (e.g., camera) to stream video feed of the participant during the interaction with other users). The different sessions can be joined by users based on devices that support access to the different sessions. For example, a user may work with a tablet to connect to a video conference and obtain a view of a VR environment of a VR interactive session of one or more users. In some instances, a VR interactive session can include multiple users that can view a displayed 3D model from different perspective in a review mode, such as a table-top review mode as presented on FIG. 4A. Further, any suitable other combination of interactive access modes (based on accessing the collaborative platform from different devices and/or access points) of users can be included in the context of the cross-reality setup between users interacting over a shared document.

Mixed-focus collaboration may involve concurrent editing of a document (which includes annotating) by multiple users at multiple locations within the document and/or at the same location in an interact manner. Thus, a document is viewed from multiple different remote instances and edited from at least some of the different viewpoints at a set of locations within the document.

Synchronous remote collaboration often requires multiple tools and techniques to support interaction between users during a creative process that has no fixed sequence of operations defined for each user. Therefore, users desire collaboration applications to provide flexible and seamless tools to integrate into interactive processes over a common shared document.

People can use different user interface applications to access a cross-reality collaboration platform for real-time, high-bandwidth communication and real-time groupware to synchronously work on artifacts such as three-dimensional (3D) models, two-dimensional (2D) floor plan models, interface designs, construction projects, machine designs, etc. In accordance with the implementations of the present disclosure, a cross-reality collaboration platform can be implemented and configured to enable remote collaboration that can result in a smooth and flexible workflow that is supported by efficient tools that reduce the number of user interactions with the collaboration application and thus improve the timeliness and efficiency of the process flow.

In some implementations, the cross-reality collaboration platform can be accessed through VR devices such as a VR headset, a head mounted display, a smart phone display, or other devices, and a VR display can present a cooperative VR environment that can be rendered to multiple users wearing VR headsets to provide them with an immersive experience to collaborate over a 3D model that is rendered in a review mode within the cooperative VR environment. In some implementations, a cooperative VR environment can be a VR environment that is accessed by users via VR, AR, and optionally with non-VR and non-AR devices to provide a display of a 3D model in a VR world, where depending on the used device, a different view of the 3D model can be loaded (e.g., an immersive view of the 3D model within the VR environment, a live streaming on a display screen on a remove device of the VR environment including avatars associated with the users who accesses the VR environment). In some implementations, the users can be displayed at the cooperative VR environment with different types of avatars (e.g., different share, color, annotation, etc.) depending on the type of device they are using to connect to the VR environment. The cooperative VR environment can be configured to receive input and/or user interaction from VR controllers that are connected to one or multiple computer devices via wired or wireless connections. The users that interact with the cooperative VR environment can be evaluated to determine whether they are authorized to access the 3D model data (3D and/or 2D data) before providing a display of the 3D model.

FIG. 1 shows an example of a system 100 usable to support collaboration between users that work remotely on shared documents during a conference call. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including VR programs, AR programs, conference call programs (e.g., video conference call programs, audio conference call programs, or a combination thereof), which support view sharing and editing functions.

The computer 110 includes a collaboration application 116 that includes implemented logic to help users involved in a common task (e.g., reviewing and editing a common shared document in parallel and/or synchronously) to achieve their goals. The collaboration application 116 can be groupware designed to support group intentional processes and can provide software functionality to facilitate these processes. In some implementations, the collaboration application 116 can be used for the initiation and execution of conferences and sharing of views (display sharing) of different users while performing editing and/or viewing operations over a shared document. In some implementations, a conference (or a conference call) can include an audio and video conference where at least one user is joining the conference with a video stream and at least one of the users is joining with an audio stream. For example, a conference call between two users where one of the users is joining with video and audio and a second one is joining only with audio can be considered a video conference.

The collaboration application 116 can run locally on the computer 110, remotely on a computer of one or more remote computer systems 150 (e.g., one or more third party providers' one or more server systems accessible by the computer 110 via the network 140) or both locally and remotely. In some implementations, the collaboration application 116 can be an access point for accessing services (e.g., visualization services 144) running on a cross-reality collaboration platform 145 that support collaborative reviews of shared data, e.g., object model data stored at a database 160 on the cross-reality collaboration platform 145.

In some implementations, the collaboration application 116 can obtain a document (e.g., an architectural design document, a construction design, floor plans, etc.) from the database 160. A user 190 can interact with the collaboration application 116 to initiate or join an already initiated virtual world (a computer-generated representation of a physical world, which can include both a to-be-built physical structure and a pseudo structure, such as an architect's office, representing a collaboration space) to work collaboratively on an obtained document, for example, a shared document 130, with other users associated with the cross-reality collaboration platform 145. In some implementations, the collaboration application 116 can provide a user interface 132 (e.g., including a portion of the shared document that is presented as a view 133 in a review mode) on a connected display device 120 to display a document shared with a set of users. The rest of the user(s) can receive a shared view of the document at different instances of the collaboration application 116.

The collaboration application 116 can present the user interface 132 on the display device 120 and multiple user interaction elements as part of the user interface 132 to support collaborative activities, such as entering and engaging with the virtual world and the avatars of others therein, opening a document, sharing your view, sharing a desktop view, performing a conference (e.g., an audio and/or video conference), or engaging in a chat function, receiving and providing information to other users, interacting with other users, among other examples.

In some implementations, the collaboration application 116 can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer (e.g., a touch screen can be an input/output device). Moreover, the computer 110 can include or be part of a VR or AR system. For example, the input/output devices (the input devices 118 and the display device 120) can include a VR/AR input controllers, gloves, or other hand manipulating tools 118a, and/or a VR/AR headset 120a. In some instances, the input/output devices can include hand-tracking devices that are based on sensors that track movement and recreate interaction as if performed with a physical input device. In some implementations, VR and/or AR devices can be standalone devices that may not need to be connected to the computer 110. The VR and/or AR devices can be standalone devices that has processing capabilities and/or an integrated computer such as the computer 110, for example, with input/output hardware components such as controllers, sensors, detectors, etc. The VR and or AR devices, either connected to the computer 110 or being standalone devices that integrate a computer (with processor and memory) can communicate with the cross-reality collaboration platform 145 and immerse users connected through these devices into a virtual world where 3D models of objects can be presented in a simulated real-life physical environment (or substantially similar environment) and users are represented with respective avatars to replicate real-life interactions.

In some implementations, the system 100 can be usable to display data from 3D and 2D documents/models that can be used to generate the virtual world presented in a corresponding interface (which can be a VR environment for one or more first users, an AR environment for one or more second users, or a non-VR-or-AR environment, for example, for one or more third users) that allows users to use the data to navigate, modify, adjust, search, among other interactive operations that can be performed with the data presented in the space of the virtual world.

In some implementations, users including user 190 can rely on different rendering technology and different user interactive input/output environment to connect, access and interact in the same virtual world as the one that can be displayed by system 100. Thus, the cross-reality collaboration platform 145 can support interconnected user interfaces that can render a virtual world where multiple users interact, either at the same geo-location or at remote locations. The users can have a different presentation of the 3D and/or 2D documents/models based on the type of graphical rendering that they are relying on (e.g., VR devices, display screens, audio and visual rendering, etc.) when rendering the virtual world.

In some instances, displaying the data in the VR and/or AR environments (as well as the non-VR-or-AR environments) can be based on obtaining 3D models 161 and 2D floorplan data 162 from the database 160. The cross-reality collaboration platform 145 can be a cloud platform that can be accessed to provide cloud services related to data visualization in different review modes and can support tools and techniques to interact with the data to navigate and modify the data in a collaborative mode in a cross-device setup when the data from the database 160 is accessed from multiple points associated with different devices and review environments. Moreover, the cross-reality collaboration platform 145 and/or the system 100 can employ the technological infrastructure, systems and techniques described in U.S. Patent Publication No. 2020/0142475, filed Nov. 6, 2019 and published May 7, 2020, which publication and/or the portions therein that support the subject matter claimed in this patent application, in that such features contribute to solving the underlying technical problem(s) and achieving the technical result(s) of the subject matter claimed in this patent application, are hereby incorporated by reference.

In some implementations, the user 190 can render the view 133 of the shared document 130 (e.g., a construction model design) that is presented on the display device 120 and visually shows how he/she (or another user interacting with the shared document 130) is modifying at least a part of the document at a particular location during a collaborative cross-reality interactive session between users.

In some implementations, other users can access in parallel a virtual world where the shared document 130 can be rendered for the user 190 as well. The users can access it with different rendering devices. Some users may be connected to the cross-reality collaboration platform and render the virtual world with the same (or substantially the same) type of interactive devices, e.g., entered a virtual room via VR goggles to share a view of the document 130, for example, as shown on FIG. 4A. In some cases, users interacting with the virtual world can render the view of the user 190 through different types of devices that support different graphical rendering capabilities. For example, some users can be provided with a display of the presentation of the virtual world via VR devices, other through AR devices, some more via desktop displays, laptops, or types of devices, for example, as shown on FIGS. 4B, 4C. It should be appreciated that the user's view of the document on the user interface 132 can change while the user is viewing the document, e.g., based on other users manipulating, interacting, modifying, or otherwise changing the view of the document.

In some implementations, while user 190 is interacting with the shared document 130, another user can interact with the same shared document 130 at another computer and based on different editing operations, while the changes done to the shared document 130 can be synchronized. The synchronization of the changes done to the shared document 130 can be done at the database 160 or at an external component (e.g., a document service hosted on a separate host) handling data synchronization operations.

In some implementations, the shared document 130 can be accessible through the database 160 or through another software application providing document management services and couples to the database 160.

In some implementations, the database 160 can store multi-dimensional document data including charts, spreadsheets, diagrams, 3D models, image data, floor plans.

In some implementations, the database 160 can include data for users that are associated with access rights for reading, writing, modifying, copying, or other operations to be performed when working with data on the database 160. For example, the user 190 is defined as a user that has access right to the shared document 130 according to correspondingly defined privileges for the user 190. Access rights and authorizations can be evaluated at the authorization services 141 provided by the cross-reality collaboration platform 145.

The systems and techniques described herein are applicable to any suitable application environment that can graphically render any portion of the virtual world, including the objects therein. Thus, in some implementations, the cross-reality collaboration platform supports view sharing to review modes of documents that are collaboratively edited by a set of users authorized to view and edit the document, and to support interaction with the documents in the different review modes and accessed from multiple types of devices, for example as described in relation to FIGS. 2A, 2B, 3A, 3B, 4A-4D, and 5A-5E. The display device 120 can render a particular view of the virtual world while the user is viewing and/or editing a portion of the virtual world at a given location. Other applications are also possible.

FIG. 2A shows an example of a process 200 to navigate within 3D model data from different review modes in a cross-reality collaboration setup in accordance with implementations of the present disclosure.

At 210, a shared 3D model is displayed in a VR environment of an interconnected cross-review collaboration application. The 3D model is displayed in a first spatial review mode, wherein the first spatial review mode includes presentation of both 2D and 3D data of the 3D model.

At 220, an indication specifying a first location within the shared 3D mode is received in the VR environment of the interconnected cross-review collaboration application and by a first user. The indication can be defined using either the 2D data or the 3D data associated with the 3D model.

At 230, a portion of the 3D model is displayed in the VR environment of the interconnected cross-review collaboration application. The portion as displayed includes a second one-to-one scale review mode, the portion of the 3D model being displayed from a perspective associated with the specified first location. The first spatial review mode and the second one-to-one scale review mode are interconnected to present at least a portion of the 3D data of the 3D model with different perspectives.

In some implementations, before entering the cross reality application (or a cross reality collaboration platform and/or one or more services provided by the platform), a user can perform user authentication with the application. In some instances, the authentication can be performed based on implemented authentication mechanism defined at the cross-reality application or platform.

In some implementations, a user can generate, create, or upload a model of an object at the cross-reality application that can be accessible through various access points, such as different user interfaces that can be accessed via desktop devices, mobile devices, VR devices, AR devices, etc. The model can comprise a 3D geometry, metadata, and 2D floorplans of an object, such as a construction site, a building, and architectural design construction, among other examples of technical construction and/or design data for contraction or manufacturing projects. Upon uploading the model, the geometry is triangulated and optimized, and different hierarchical levels of geometric detail are generated. There can be multiple hierarchies, based on the spatial distribution of the model (e.g. bounding volumes of each part of the model, starting from the outside), but also on the metadata (e.g. building→floor→room, or column→joist-→floor, etc.)

A mapping between the 2D coordinates of each floorplan, their corresponding coordinates in the 3D model, and the metadata is computed and then stored in the cross-reality application or at another storage (e.g. a cloud space accessible by users of the cross-reality application).

In some implementations, a user can access the cross-reality collaboration platform through different access applications or through a web browser (or other access point). In some implementations, a user can enter a collaborative VR environment comprised of personal virtual desks and a shared platform in the middle of the room to display the model, which is referred to as the "pedestal." Such review modes are shown in FIGS. 4A to 4D and 5A to 5E.

In some implementations, a user can access a table-top review (such as the table top review 310 of FIG. 3A or 410 of FIG. 4A as described below).

In some instances, using sensors on a headset of a user interacting with the VR environment, the cross-reality collaboration application can map the user's real-world desk to their virtual desk within the cross-reality experience when displaying one or more 3D models. This will act as (passive) haptic feedback to facilitate hand-based interactions with their personal virtual desk. The user can authenticate into a cloud system where their architectural model is stored or at the cross-reality application when the model is stored at a comprised or associated storage space. The virtual desk allows the user to browse the cloud storage or another storage accessible from the VR interface (e.g., hubs, projects, folders, etc.) and select a model (uploaded by the user or by another user but still accessible) for review in the cross-reality space.

The 3D model and its corresponding floor plans (e.g., 2D data) and metadata, which are stored in the storage, can be streamed into the user interface of the VR environment (or another desktop environment). In some implementations, the 3D model can be loaded progressively on the pedestal at the highest possible level of detail that will not affect the application's performance (e.g., ~60 FPS and low latency) but will always show a high level representation of the model, such as a full "shell" (or outside view) of the model. In some cases, this can be referred to as the "dollhouse model" or a "scaled model" view.

FIG. 2B shows an example of a process 240 to download and render data from a 3D model in accordance with implementations of the present disclosure.

At 245, network download speed and graphical rendering speed of a computing device are determined.

At 250, an initial set of data from a 3D computer model is downloaded and rendered in accordance with the network download and graphical rendering speeds. The initial set of data can specify at least an outer shell portion of the 3D computer model.

At 255, 2D data representing objects in the 3D computer model is downloaded and rendered.

At 260, user input selecting a portion of the 2D data is received.

At 265, a currently ongoing download of a remaining set of data from the 3D computer model is terminated.

At 270, a different set of data from the 3D computer model is downloaded and rendered. The different set of data is determined by the user input selecting the portion of the 2D data.

In some implementations, the loading of the 3D model at the pedestal can be at least partially determined based on the network bandwidth and/or rules for rendering of the presentation of the 3D model in the particular environment, such as the VR environment. In some implementations, the level of detail that is applied when rendering a 3D model can be dynamically determined based on current network capacity (e.g., relevant for the rendering device and communication with the cross-reality collaboration platform) and download specifics so that the speed of the rendering would not affect the user experience. In some implementations, the level of detail that is applied can be dynamically determined to match a time period threshold for rendering the 3D model.

In some instances, at 275, in response to determining a level of detail to be applied for rendering, defining a set of 2D data to be rendered (e.g., in interactive form allowing the user to determine a different view of the 3D model). In some instances, the 3D model can be rendered with a first level of detail, where the level of detail can be adjusted (automatically, based on user instructions, and/or a rendering rule configuration) to support reduced resource expenditures while maintaining high availability. The user can select a 2D floorplan of a room (or a floor, or particular space portion of the visualized volume) inside the model by using the model's metadata hierarchically (e.g., select a given floor using a slider, and then within that floor select a specific room). An interactable 2D floorplan is rendered on a plane (e.g., as presented at FIG. 5A or 5B) in front of them on their virtual desk. Each user can be provided with options to navigate their own floorplan and be presented with a different view. This floorplan can be zoomed in and out, translated, and rotated to navigate the model.

Figure 5A:
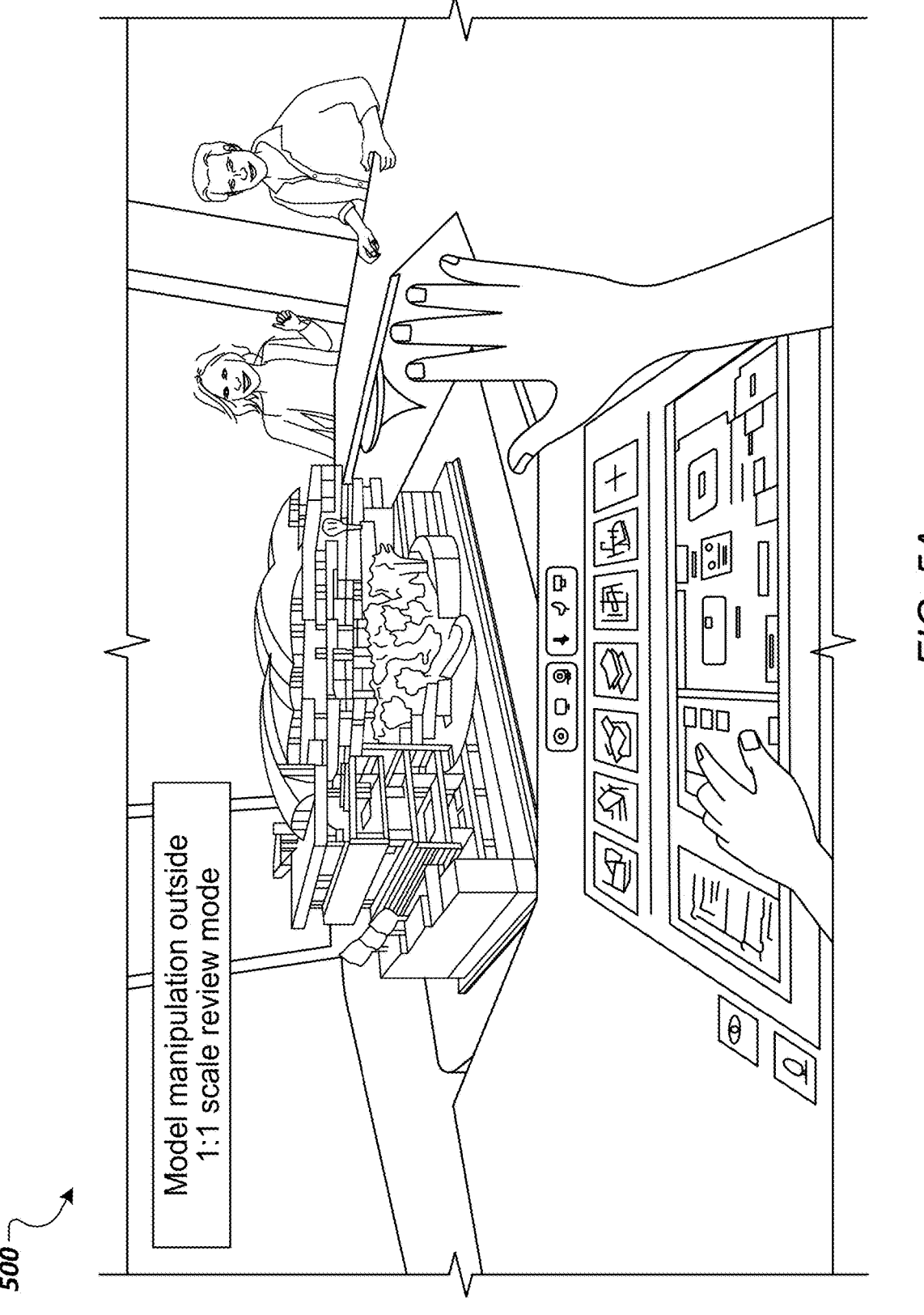
FIG. 5A shows an example of a table-top review mode that is manipulated from a 2D data presentation mode in accordance with implementations of the present disclosure.
Figure 5B:
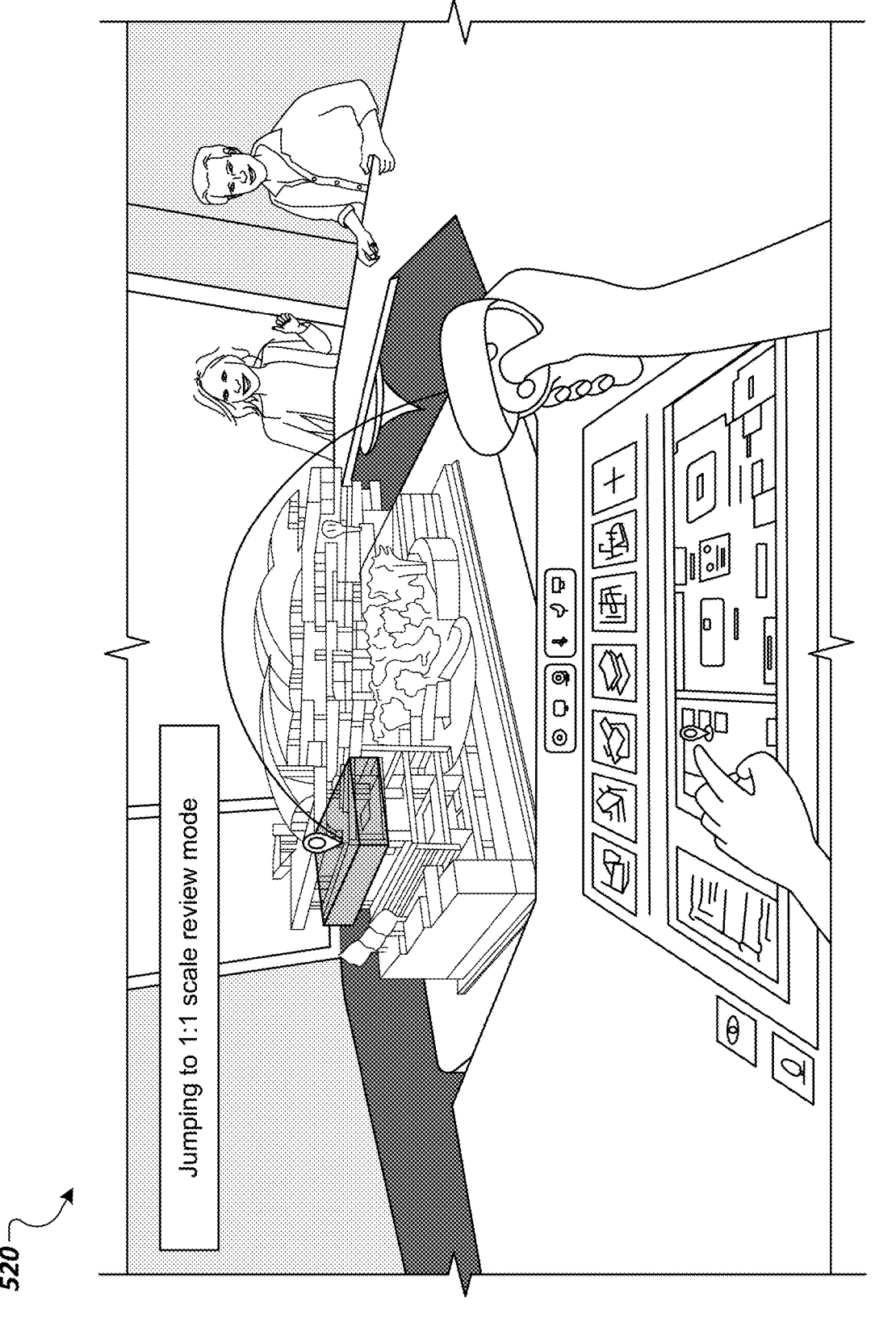
FIG. 5B shows an example of a process of manipulating a table-top review mode of a construction data model based on interaction with 2D floor plan associated with the construction data model in accordance with implementations of the present disclosure.

If the user selects a part of the floorplan, using the 2D to 3D map, the corresponding volume is highlighted in the 3D model as well as the area on the 2D plan, as shown on FIG. 5B. With the highlighted volume, the user can select to show this part of the model in high detail in the shared model. This level of detail is presented to all users in a synchronous way.

In some implementation, when the 3D model is presented in the table-top view, a portion or all of the 3D data related to the model can be downloaded and used for the rendering. For example, the different level of detail that is relevant for rendering the 3D model can affect the amount of data that is downloaded for the data visualization. By reducing the amount of data to be downloaded (either 2D and/or 3D data) to present a doll-house view of the 3D model, network bandwidth can be conserved. In some implementations, a user may configure a level of detail that is relevant for the presentation of the data at a particular user interface used by the user to show a 3D model and based on such configurations, not all but some of stored 3D data for a 3D model can be downloaded. Such filtering of the amount of data to be downloaded, which can be dynamically adjusted or can be iteratively trained based on evaluation of user interactions, can be used to reduce the resources consumed to provide a cross-reality collaboration experience for users in a cross-device environment. In some implementations, based on the level of detail that is applied for rendering 3D data for the 3D model, a correspondingly defined set of 2D data can be determined and rendered to allow users to interact with that 2D data and obtain more detailed or different views of the 3D data of the 3D model.

Figure 5C:
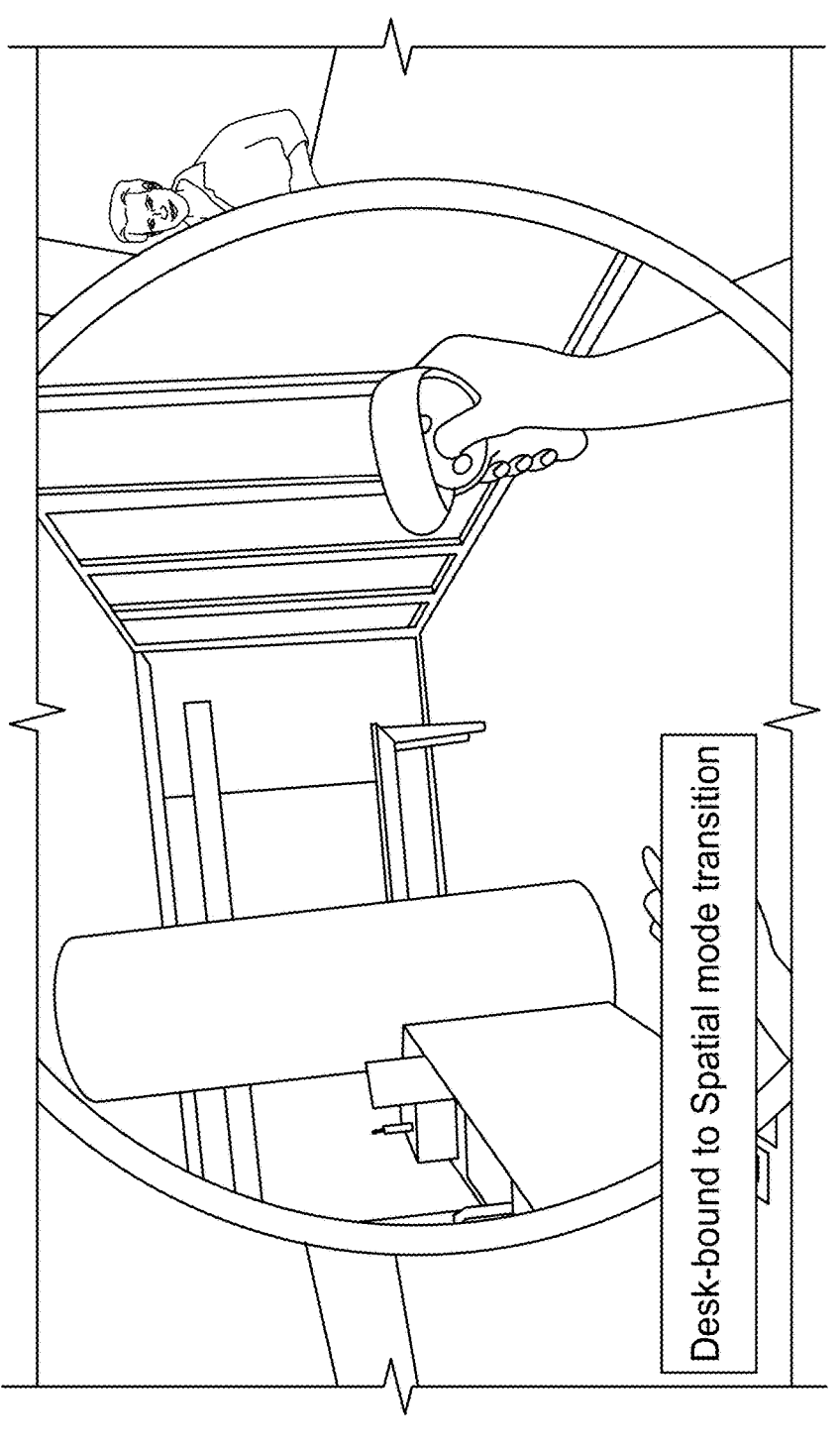
FIG. 5C shows an example of a user interaction with a spatial review mode presented in a VR environment provided by a cross-reality collaboration platform in accordance with implementations of the present disclosure.

The user can also teleport themselves inside the 3D model at the highlighted location, for example, as shown on FIG. 5C. This can be referred to this as the "1:1 Review Mode." Other users will be able to see the location of the user in their personal floorplans, and a miniature representation of their avatar in the dollhouse model.

Figure 3A:
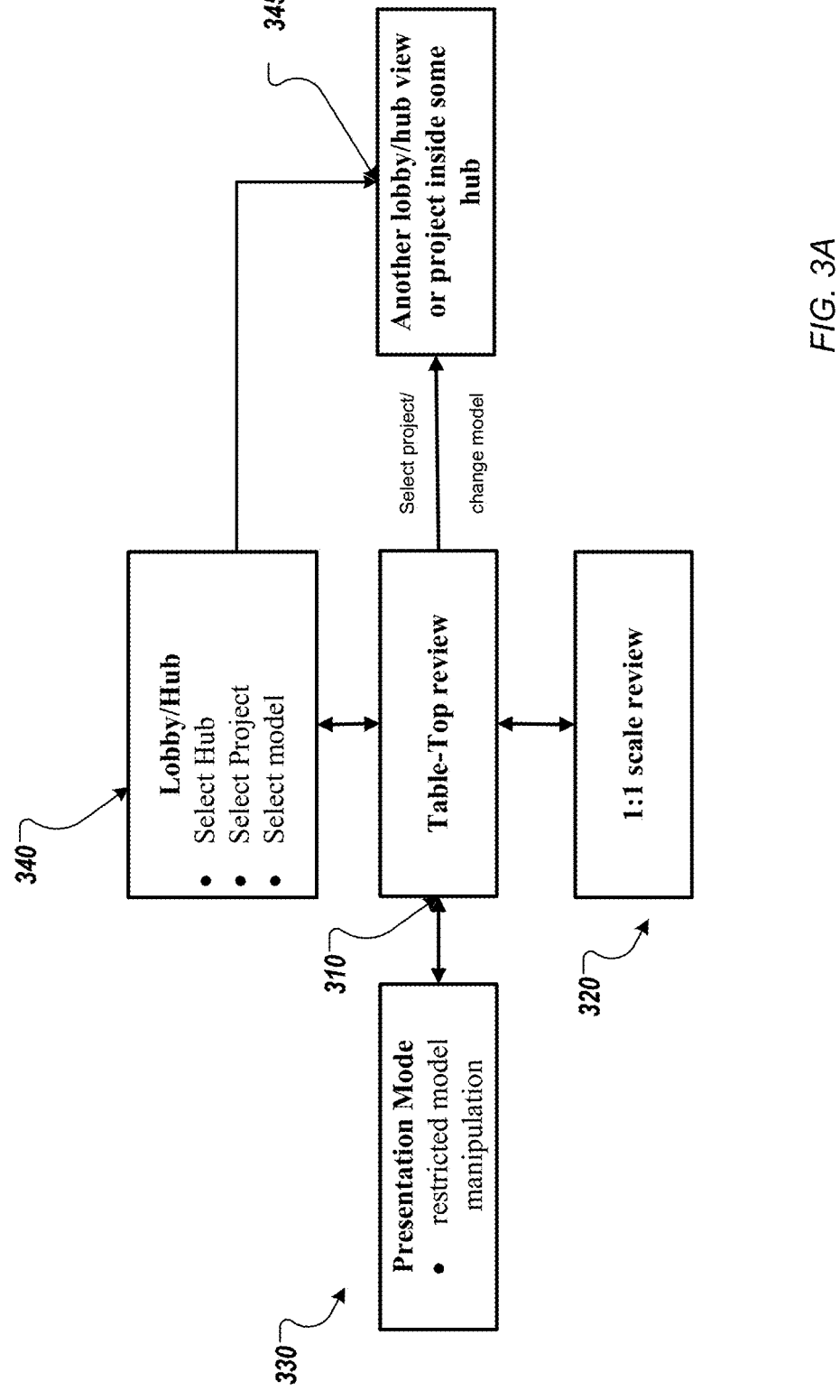
FIG. 3A shows an example of a process to navigate between different review modes at a cross-reality collaboration system in accordance with implementations of the present disclosure.

FIG. 3A shows an example of a flow 300 to navigate between different review modes at a cross-reality collaboration system in accordance with implementations of the present disclosure. In some implementations, the cross-reality collaboration system can be substantially similar to the cross-reality collaboration platform 145 of FIG. 1.

In some implementations, a cross-reality collaboration platform can support presentation of data including 2D data and 3D data related to data models (e.g., construction models architectural models, machine models, and physical object models, among other examples).

In some implementations, a user can access an application that provides access to data at the cross-reality collaboration platform, such as 3D model data of an object such as a construction site. The user can access a first user interface where a first review mode can be presented. For example, the user can access a lobby/hub 340 mode.

In some implementations, when a user enters the lobby/hub 340 mode by displaying in a VR environment of the cross-reality collaboration platform, the user can be provided with 3D models in spatial review modes and can search and select projects and/or models to further interact with in other review modes that can be open in other interactive sessions. In some cases, these interactive sessions can be shared with other users that can display a similar review mode (e.g., displayed from another perspective based on the interaction perspective of the user that displays the review mode).

Afterwards, the user can enter a table-top review mode 310 which is basically the central element of the experience. In some implementations, the table-top review 310 can be opened by a user who wants to interact with a 3D model of an object to interact with the model in a collaborative environment with other users that can access and interact with the model either through displaying the table-top review 310 (e.g., with a different view perspective) or though remote access (e.g., from a device that accesses the session between users that view the table-top review 310).

From this table-top review 310 mode, the user can jump into the Presentation Mode 330 and to a 1:1 Scale Review mode 320. Switching between modes can be performed based on user interactions received with the virtual environment where the model data is presented, where the interaction can be performed by one or more of the users (e.g., a user that is authorized to navigate in a session).

The presentation mode 330 can be provided as a VR interface where users are seated in a seating arrangement around the table-top review 310 of a 3D model as a doll-house placed in front of them and facing white board for presenting additional information and allowing additional control or guiding within the 3D model doll-house display.

In some implementations, the user can also access and navigate from inside the experience of the table-top review 310 and choose another lobby or hub view or project inside some hub 345. The other project can include a model or other portion or aspect of the virtual world provided by the cross-reality collaboration platform.

Figure 3B:
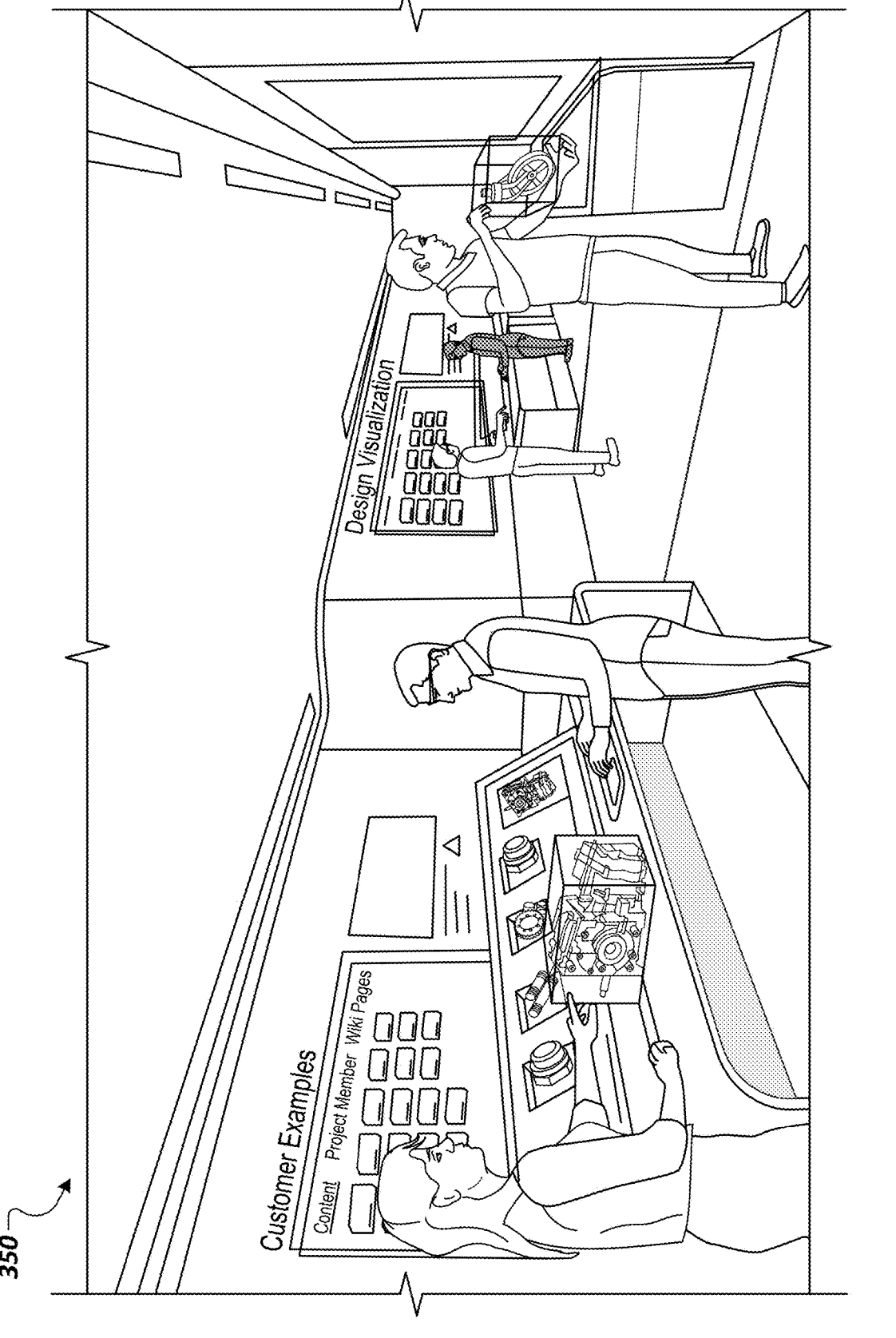
FIG. 3B shows an example of a lobby review mode provided at an interface of a cross-reality collaboration system in accordance with implementations of the present disclosure.

FIG. 3B shows an example of a lobby review mode 350 provided at an interface of a cross-reality collaboration system in accordance with implementations of the present disclosure. In some implementations, the lobby review mode 350 can be such as the lobby review mode at the lobby/hub 340 mode at FIG. 3A. The lobby review mode 350 can provide an overview of available data that can be further interacted with through display at different review modes presenting at least a portion of the data related with a given model and/or project.

Figure 4A:
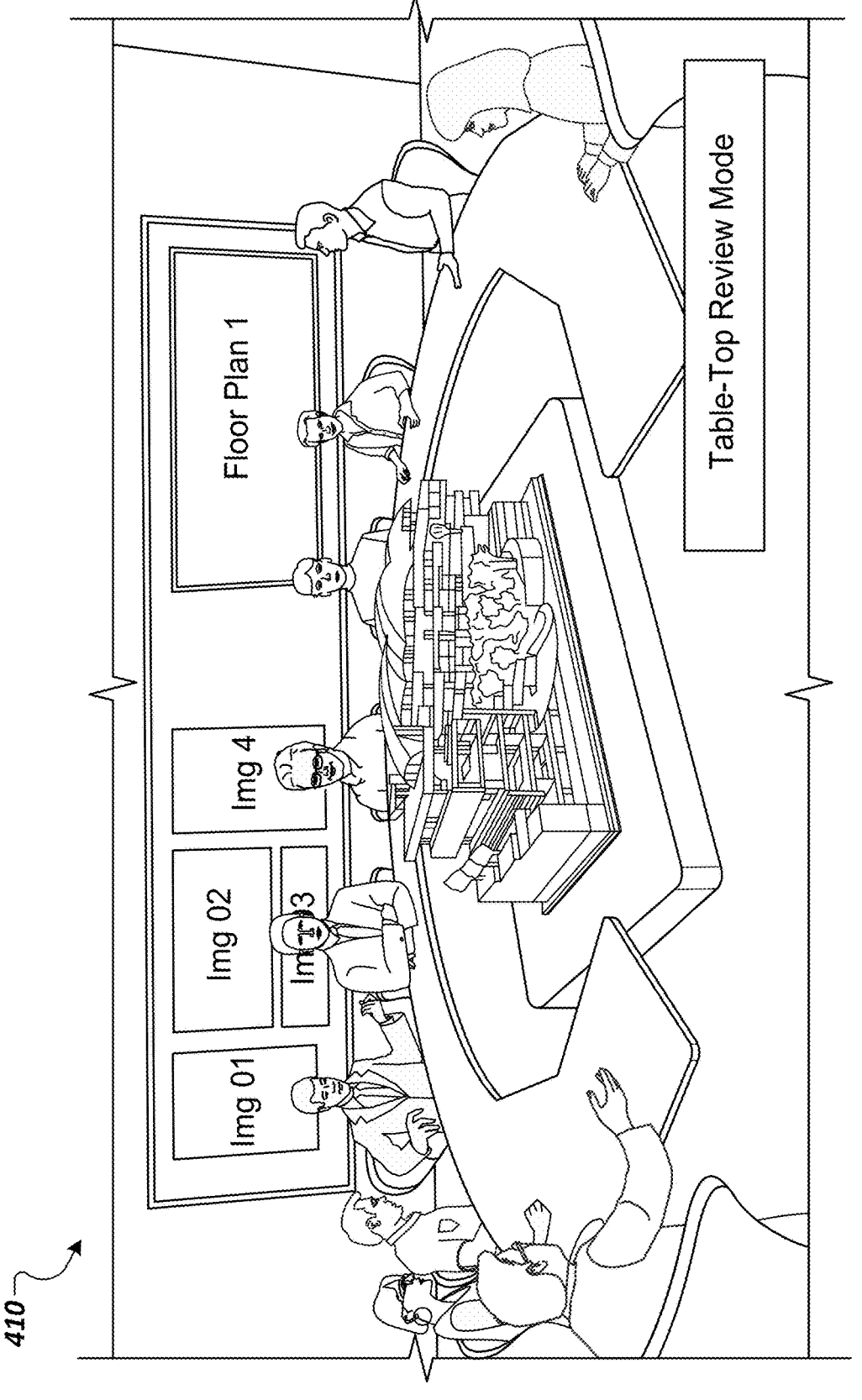
FIG. 4A shows an example of a table-top review mode in accordance with implementations of the present disclosure.

FIG. 4A shows an example of a table-top review mode 410 in accordance with implementations of the present disclosure.

This is an illustration of what the table-top review mode 410 (e.g., corresponding to the table-top review 310 mode of FIG. 3A) within a VR interactive session supporting collaborative design experience for a set of user can look like.

The users that interact with a virtual world (or virtual environment) that can be rendered to represent a physical world where the table-top review mode 410 and/or other modes of the 3D object are displayed can be seen as avatars within the respective representations of the virtual world provided to each user based on the interface input and output devices used to participate in the virtual world (e.g., a VR device can be used to participate in a VR experience, while an AR device such as an IPAD can be used to render the virtual world on the screen of the IPAD as display streaming to connect the VR experience of the users on the VR devices with the user on the AR device). The connections of the users through different user interfaces supports the cross-reality collaboration experiences over different types of devices that are configured to access the cross-reality collaboration platform (e.g., the cross-reality collaboration platform 145 of FIG. 1) and participate in a virtual collaboration that is rendered with rendering tools and techniques corresponding to the used devices by the users and viewing characteristics of the review modes on those devices.

In some implementations, the table-top review mode allows users to be immersed in a virtual world that can simulate a conference style set up around a doll-house scale model on a central pedestal, as shown on FIG. 4A. Users can bring in any 3D model from the cross-reality collaboration platform (e.g., a cloud storage, database, or hard-drive, among other example storages) to review here in this review mode. Further, the user interface of the VR environment can include a white board visualized on the virtual walls that can present 2D data related to the model that is presented in the table-top review mode in the middle of the virtual table (on the central pedestal). The desk allows users to do complex interactions like browse a storage of models and/or other documents, pull up 2D data, interact with the central model in multiple ways, etc.

The white board(s) visualized in the virtual conference room that supports interaction of multiple users can be populated with 2D data such as blueprints, floor-plans, renders, sheet constructions views (e.g., REVIT SHEETS), etc. The displayed data within the VR environment can be used for context and discussion purposes between users who are part of or are associated with (through accessing other interconnected review modes of the same model) the VR environment sessions. The users that are associated with the table-top review mode 410 can include one or more users that access the review mode 410 via VR devices, and in some cases other users that can access the VR environment via other devices, such as a tablet computer, and still participate in a collaborative experience that is a cross-reality experience.

Figure 4B:
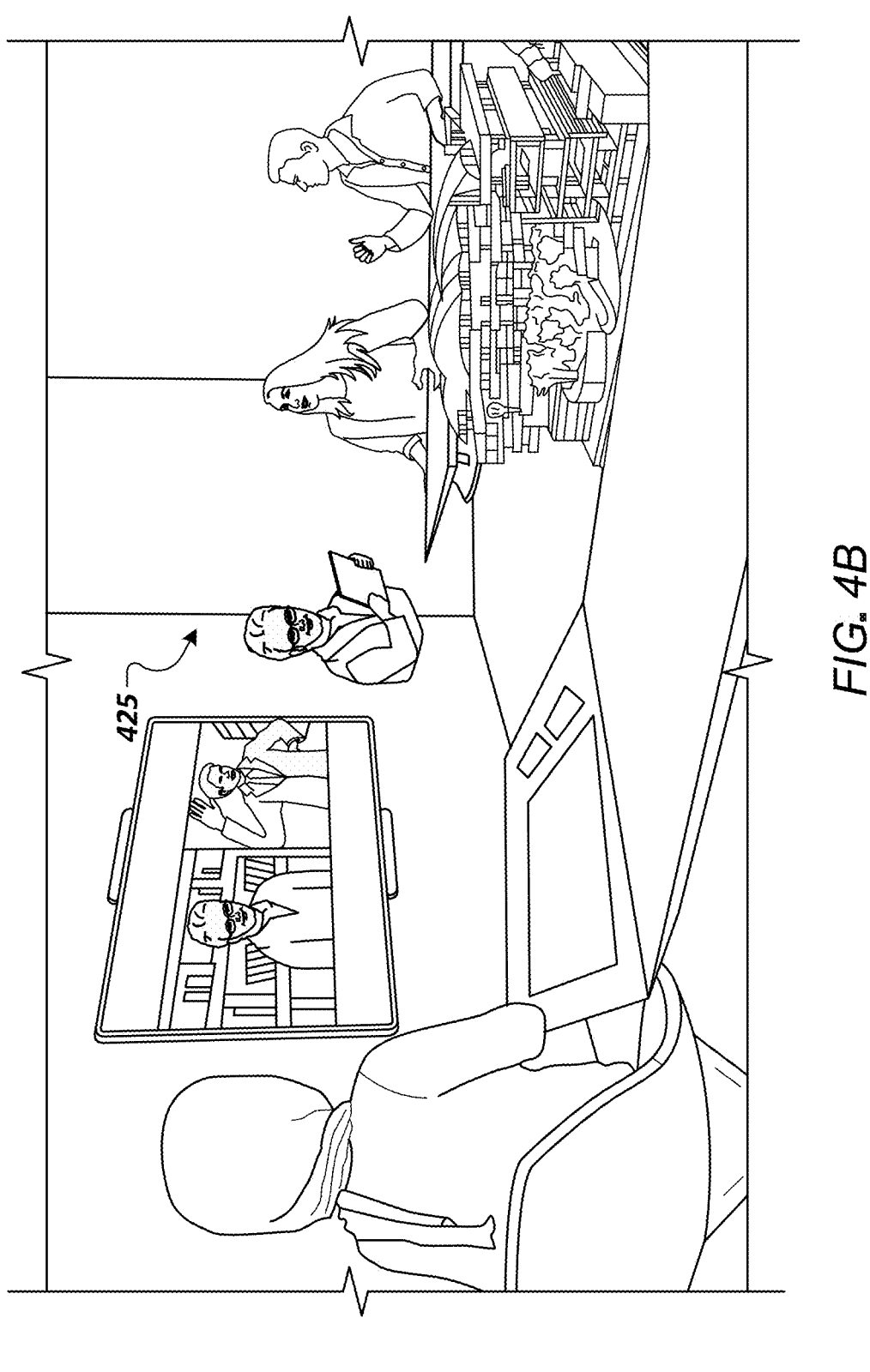
FIG. 4B shows an example of a table-top review mode provided for display to multiple users accessing a cross-reality collaboration system through different device types in accordance with implementations of the present disclosure.

FIG. 4B shows an example of a table-top review mode 420 provided for display to multiple users accessing a cross-reality collaboration system through different device types in accordance with implementations of the present disclosure.

In some implementations, the present solution including cross-reality collaboration supports cross-platform connections. The illustration shows how users can join in by using AR devices like AR HMDs or AR handheld devices like IPADS. The avatar 425 can represent a user who joined the VR experience of the table-top review mode 410 of FIG. 4A using a tablet such as an IPAD. Additionally, users accessing the cross-reality collaboration platform via desktop devices can also join the experience using a web camera in a conference video-call, as illustrated in FIG. 4B. These users accessing via desktop devices receive a display of the table-top review mode of the 3D model from a different perspective and different display capabilities. For example, the video display of the users can be streamed in the VR environment, and the display in the VR environment of the table-top review of the model can be shared as a live stream to the users thus to support collaborative interaction and discussion of portions of the model or the model as a whole.

Moreover, each avatar in the virtual world can include an aspect of their appearance that is shared by all avatars accessing the cross-reality collaboration platform with a similar type of device. The aspect of the appearance can be a different color, color patch or symbol on the avatar, a different pattern of stripes and/or a different opacity when the virtual world behind the avatar can be seen (at least partially) thru the avatar, and/or a representation of the access device being used, such as is shown for the avatar 425 representing a user accessing the virtual world via a tablet computer. Thus, users experiencing the virtual world can readily see what type of access device and/or method each user is using based on the displayed aspect of the avatar for that user. This can facilitate the user's interaction with the platform and the other users who are accessing it to collaboratively work on a project since expectations of who can see what level of detail are immediately set appropriately without any discussion.

Figure 4C:
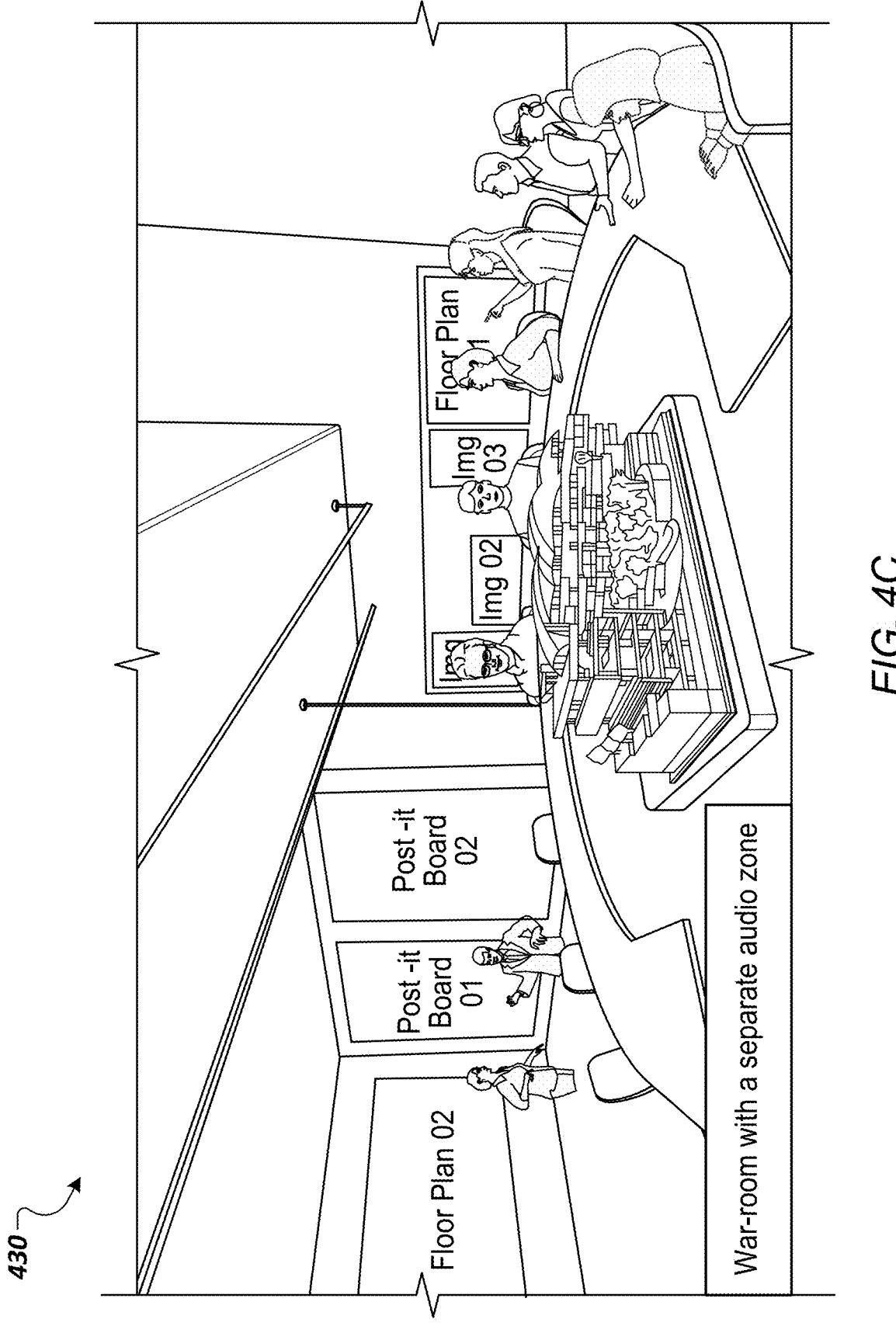
FIG. 4C shows an example of a war-room review mode with a separate audio zone in accordance with implementations of the present disclosure.

FIG. 4C shows an example of a war-room review mode 430 with a separate audio zone in accordance with implementations of the present disclosure.

In accordance with implementations of the present disclosure, a table-top review mode can be extended with a separate audio-zone breakout space called 'War-rooms' which can be adjacent to the main Table-top review mode. The additional breakout space can include other users that can be isolated or incorporated partially or fully in the VR experience of the users joining the VR environment and interacting with the model in the table-top review mode.

The war-room space can be a separate audio-zone than the table-top review space, meaning users in the main table-top space cannot hear people in the war-room and vice-versa. These spaces allow users to freely move around and explore and have deeper or private conversations with each other if the review session demands it. The walls displayed as part of the 'War-rooms' can also be whiteboard spaces or post-it board spaces allowing users to bring in any 2D asset from the cross-reality collaboration platform or a cloud storage of 3D model data for display during collaboration over one or more 3D models and presentation of interactive navigation and/or modification of at least one 3D model within the VR environment.

In some implementations, the audio distribution within the virtual world can be based on the different positioning of the avatars of the users in the virtual world, which can simulate real physical world experiences, where people who sit closer to each other can hear each other better and be at least partially isolated from other people in the same space but with further distance away. Moreover, the simulation need not correspond to the real physical world exactly, but can be modified to facilitate the collaboration. For example, in some implementations, avatars in the Table-top review area in FIG. 4C can see into, and walk into, the War room area, but not hear any of the conversations happening in the War room area. Note that this "cone of silence" effect need not be true in the reverse direction, so in some implementations, the users with their avatars in the War room can still hear conversations happening in the adjacent Table-top review area.

Figure 4D:
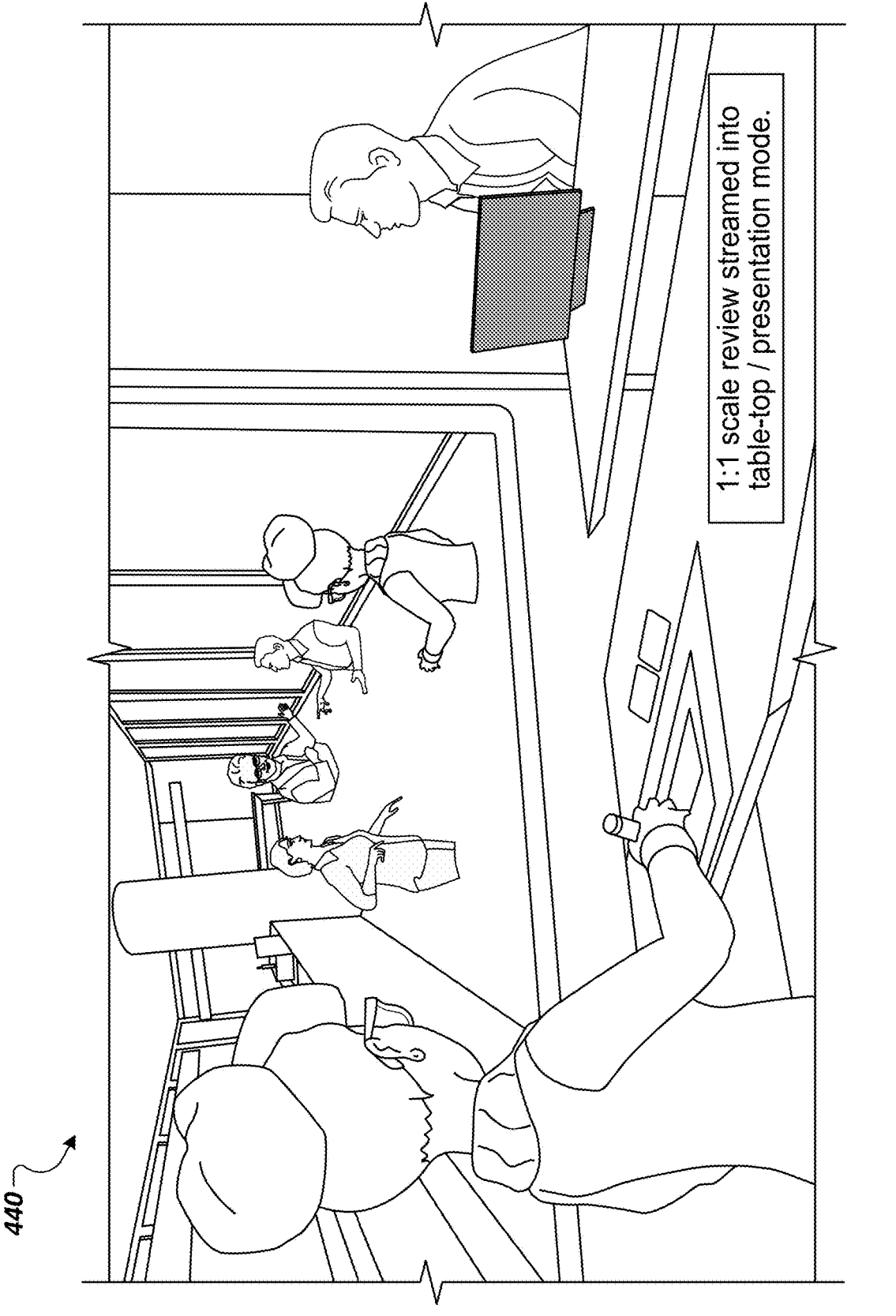
FIG. 4D shows an example of a one-to-one scale review mode associated with one or more users accessing through VR and/or AR devices that is streamed into a first table-top review mode of one or more other users accessing a second table-top review mode through different VR and/or AR devices in accordance with implementations of the present disclosure.

FIG. 4D shows an example of a one-to-one scale review mode 440 associated with one or more users accessing through VR and/or AR devices that is streamed into a first table-top review mode of one or more other users accessing a second table-top review mode through different VR and/or AR devices in accordance with implementations of the present disclosure.

FIG. 4D shows how a VR environment can look when users in the Table-top review mode (such as the table-top review mode 410 of FIG. 4A or 310 of FIG. 3A) are incorporated into a discussions of users in a 1:1 scale review mode, for example, where the users in the 1:1 scale review mode are following the discussions of the users in the table-top review mode. In some implementations, the audio distribution during discussions of one or more users or sets of users can be adjusted to match to their avatars' locations in the virtual environment and/or associated with the type of connection between different review modes. In some implementations, the two environments—the VR environment with the table-top review mode and the users in the discussion mode (viewing the table-top review mode through the display screen on the left upper corner of the drawing)—can support communication that can be a two-way communication via a screen (the display screen) or via another portal displayed on one or more display devices (e.g., a laptop of a user). In some implementations, the users that are in the VR environment in the 1:1 scale review mode may be restricted to hear audio sounds coming from the table-top review mode. The table top review mode (or a presentation mode) can receive a streaming of the VR environment in the 1:1 scale review mode on the display screen at the top left of FIG. 4D. In some other instances, the audio streaming coming from the VR environment of the 1:1 review mode that is streamed can be associated with audio distribution settings for a sound level that matches a location of the respective avatars in the virtual world and their associations with the locations within the review modes and/or connections to particular VR content within interconnected review modes.

FIG. 5A shows an example of a table-top review mode 500 that is manipulated from a 2D data presentation mode in accordance with implementations of the present disclosure. FIG. 5A shows how users can use a desk in the Table-top Review mode (e.g., 410 of FIG. 4A or another table-top review mode shown as part of any one of the FIGS. 4A to 4D) to pull up floor-plans and sheet view(s) in a construction document set (e.g., REVIT SHEETS) associated with the model in table-top review mode and use it to navigate and interact with the central doll-house model. The sheet views can include multiple drawings or schedules of a construction model on each sheet view, where those views are generated as a result of building the model (e.g., based on a construction project template). These views are technical documents that identify measurements and positioning of physical objects in the 2D space. Additionally, users can browse the entire database or storage of projects and/or data models that can be interrelated to a single or multiple projects (e.g. organized in a project-tree) and also save and access various view-points of one or more models for easy navigation into the model.

FIG. 5B shows an example process 520 of manipulating a table-top review mode of a construction data model based on interaction with 2D floor plan associated with the construction data model in accordance with implementations of the present disclosure. FIG. 5B shows how users can leverage 2D data (or 3D data presented at the table-top review separately from the doll-house preview of the 3D object and not shown on the FIGS. 5A and 5B) to precisely navigate the model (as presented in the table-top review) and use it to transition/jump into 1:1 scale review of the model from the Table-top review mode.

In some implementations, by allowing to interact with 2D data (which can be, or be from, the technical documents referenced above) to manipulate and navigate a presentation of 3D data for a 3D model in a review mode (e.g., table-top review mode), the resources used at each or some of the rendering devices are utilized in more efficient manner. When 2D data is rendered in sheet views, not all sheets need to be fully loaded, but still search functionality can still be available to identify a location within the 2D data and to map it to a portion of the 3D data of the model that is not be rendered (yet or at all) as part of the doll-house representation of the 3D model. Generally, even if the doll-house representation of the 3D model is with a fine grain of detail or with lower level of detail (or anywhere in between), by interacting with the 2D data, a desired portion of the 3D data (that is not fully rendered at the doll-house representation) can be readily identified based on user input and then rendered to the appropriate devices. In such manner, flexible yet efficient switching between different display modes and different levels of data to be rendered can be supported. Such implementations can improve the timeliness to render 2D and/or 3D data, and also may improve the performance of the cross-reality platform and its responsiveness to user interactions received through various devices used by users to interact with the data and participate in collaboration reviews.

In some implementations, the manipulation of the 2D floor plan data can be performed from a user who is on a device that is not a VR device and the user is projected into the VR world (e.g., the user on the IPAD on FIG. 4B). The user who is manipulating the 2D data may be rendering the data on a device that may have restricted rendering capability or limited network connection speed. For example, the user who accesses the virtual world through an AR device such as an IPAD can be at a construction side and may be obtaining a view of the virtual world via the AR environment on a display with limited rendering capabilities due to a small screen size, limited processing power, resolution constraints, etc.

FIG. 5C shows an example user interaction 530 with a spatial review mode presented in a VR environment provided by a cross-reality collaboration platform in accordance with implementations of the present disclosure. FIG. 5C shows a transition from a Table-top review mode to 1:1 scale review mode from the user's perspective of a user interacting with the environment via VR user interaction devices (e.g., stick and goggles).

Figure 5D:
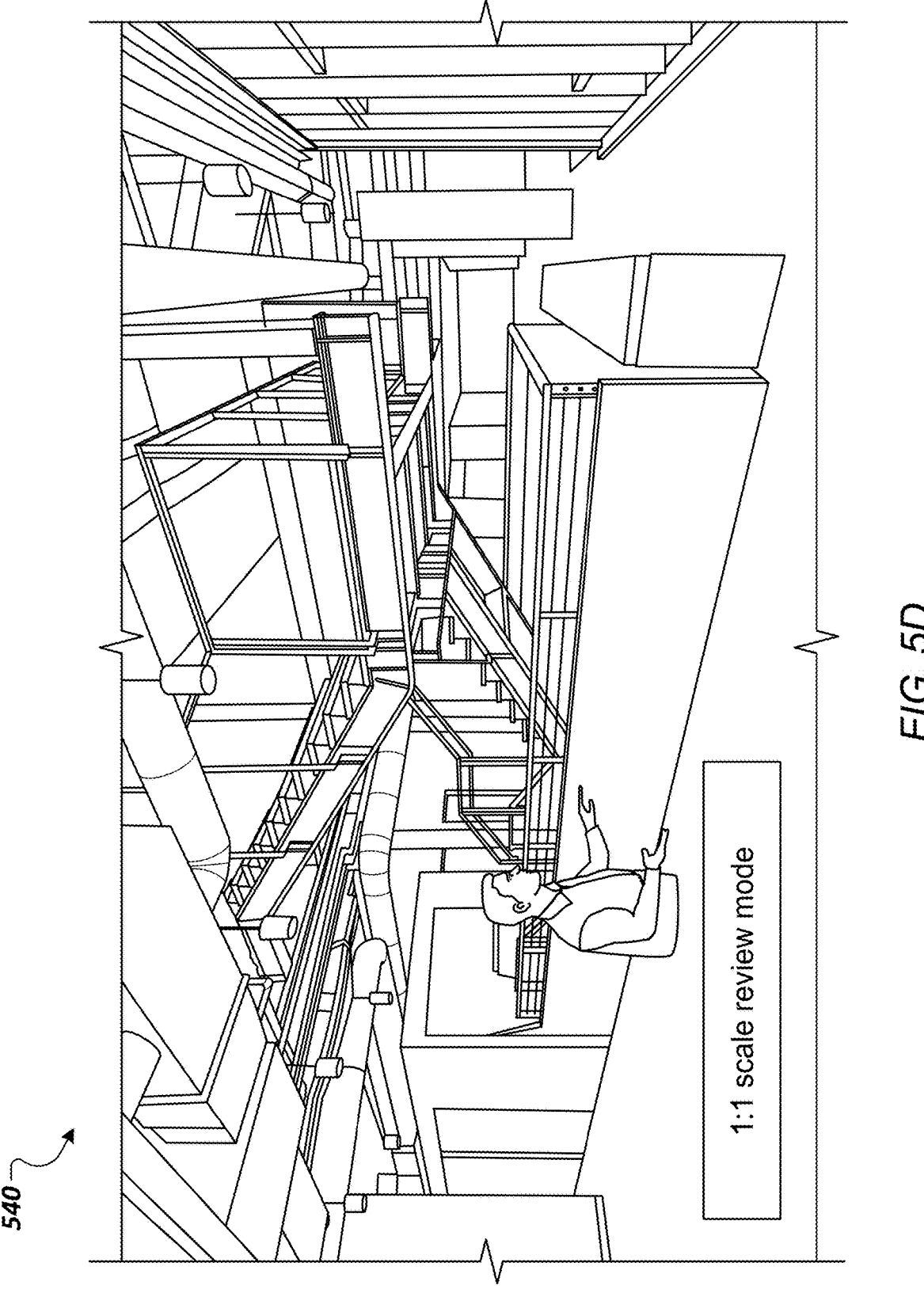
FIG. 5D shows an example of a one-to-one scale review mode in accordance with implementations of the present disclosure.

FIG. 5D shows an example of a one-to-one scale review mode 540 in accordance with implementations of the present disclosure. The one-to-one scale review mode 540 can be entered based on the interaction for transitioning or jumping from the table-top review mode as shown at FIG. 5B, where the interaction is performed with the 2D data associated with the 3D model, as displayed on a desk display table or other display screen (e.g., whiteboard). The interaction can be performed by various means including gestures, voice commands, VR devices, or implemented rules triggered by events, among other examples.

Figure 5E:
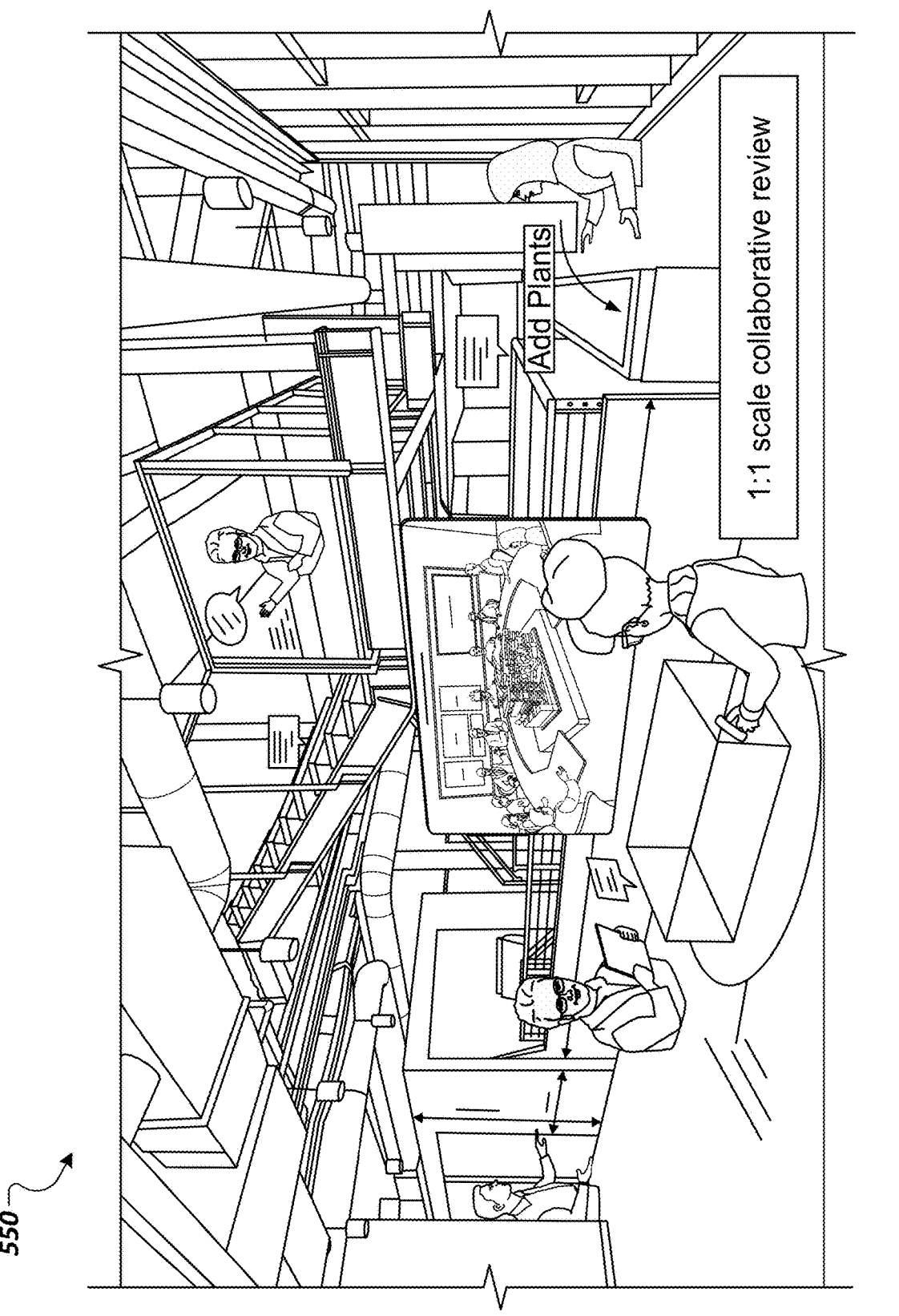
FIG. 5E shows an example of a one-to-one scale collaboration review mode that includes streaming of review modes associated with sets of users in accordance with implementations of the present disclosure.

FIG. 5E shows an example of a one-to-one scale collaboration review mode 550 that includes streaming of review modes associated with sets of users in accordance with implementations of the present disclosure.

FIG. 5E shows how users can have various concurrent scales of review modes inside the same session. At FIG. 5E is shown how a user who is within the model in the 1:1 review mode communicating with others who are in the Table-top review mode via a 2-way screen interaction like a conference (audio and/or video call) that is executed between two different VR modes. The one-to-one scale collaboration review mode 550 can support interaction of users accessing a 3D model via multiple VR modes and/or a desktop or tablet device, as well as can be combined with war-room experience to extend the collaboration. In some instances, various group of collaborating users can be determined based on different interaction modes and display perspectives they interact with at one collaborative session (such as the one presented at FIG. 5E).

In some implementations, the cross-reality collaboration experience in accordance with the present implementation can be provided by a cross-reality platform that provides virtual environments that support multiple types of synchronous and asynchronous review discussions among multiple users provided with different access rights and roles in a project when working on a shared document such as a 3D model. The 3D model data can be stored at a storage (e.g., database 160) that is accessed as a single source of truth when providing representations of the model in the various review modes. According to the present disclosure, a productive and grounded virtual review environment is provided where users can bring 2D and 3D model data from a storage, e.g., cloud storage, and have a discussion over presentation of the model data in various forms and review modes. The presented review modes at different devices of the users who collaborate over the 3D model can support efficient collaborative review process that supports efficient display of data in real time across various VR environments and/or AR environments, as well as using computing devices that do not provide a VR or AR environment.

Figure 6:
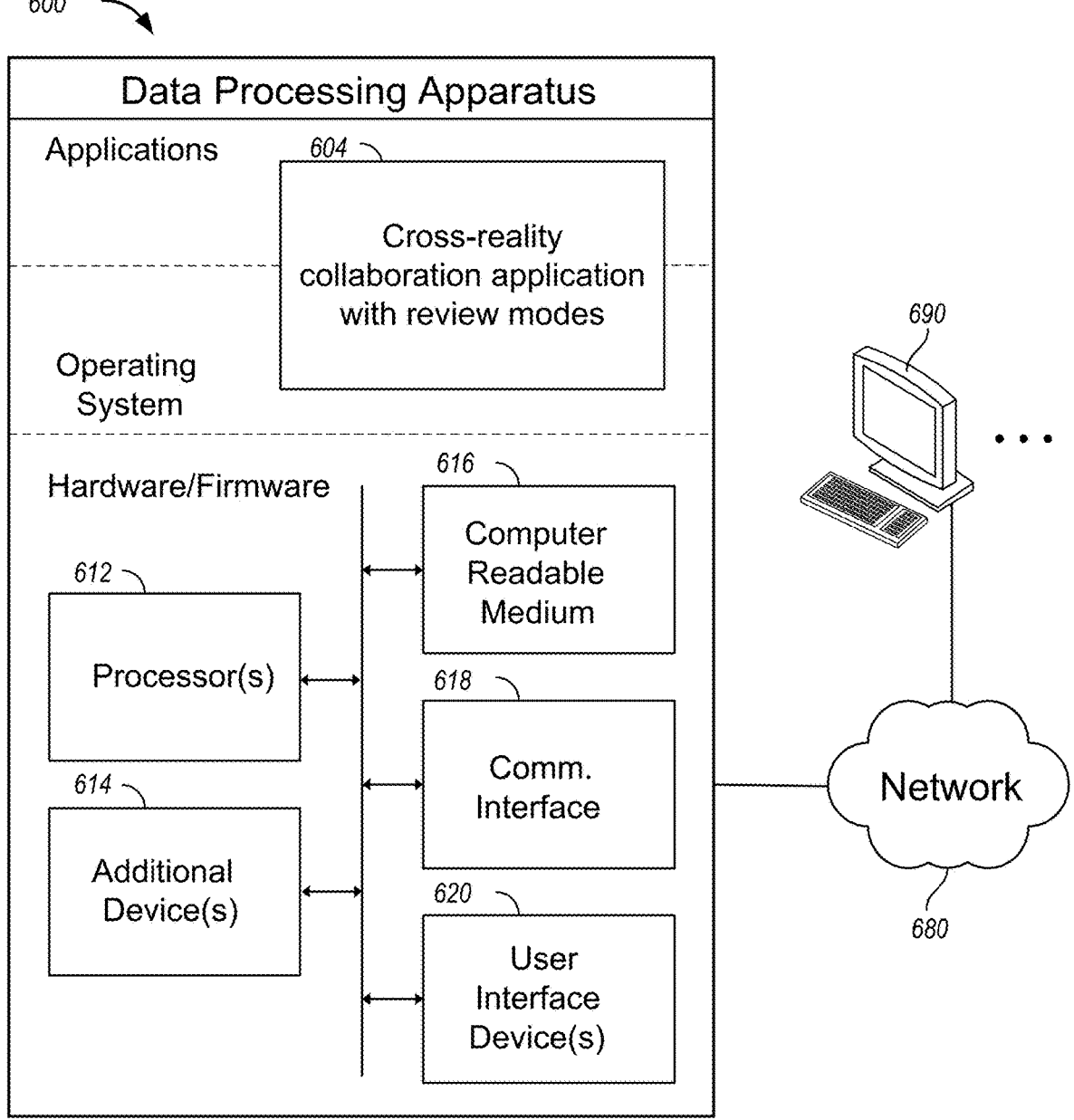
FIG. 6 is a schematic diagram of a data processing system including a data processing apparatus, which can be programmed as a client or as a server.

FIG. 6 is a schematic diagram of a data processing system including a data processing apparatus 600, which can be programmed as a client or as a server. The data processing apparatus 600 is connected with one or more computers 690 through a network 680. While only one computer is shown in FIG. 6 as the data processing apparatus 600, multiple computers can be used. The data processing apparatus 600 includes various software modules, which can be distributed between an applications layer and an operating system. These can include executable and/or interpretable software programs or libraries, including tools and services of a cross-reality collaboration application 604 with review modes that includes a user interface that allows displaying of a document to a user of the cross-reality collaboration application 604 in one or more review modes, where different modes can be available based on the device type that is used to interact with the cross-reality collaboration application 604. The cross-reality collaboration application 604 can provide review modes as described throughout the present disclosure. Further, the cross-reality collaboration application 604 can implement conference call functionalities, document sharing and editing, and determination of locations within the shared document that are viewed by the user, among other functionality as described throughout the present disclosure. The number of software modules used can vary from one implementation to another. Moreover, the software modules can be distributed on one or more data processing apparatus connected by one or more computer networks or other suitable communication networks.

In accordance with the present implementations, a multiple interconnected cross-reality review mode is provided that:

Provides a design-review solution which contains multiple interconnected extended-reality (XR) review modes (e.g., including AR and/or VR review modes) within each session that allows various types of review discussions. For example, 1) A Table-top review mode which acts like a virtual architectural presentation/ discussion space 2) A spatial 1:1 review mode which allows users to review the model in 1:1 scale. 3) A virtual 'War-room' which is a separate audio-zone and functions like break-out space for users to have more robust & ad-hoc discussions.

Provides a seamless solution to jump between different modes whenever needed without breaking continuity A solution that can be conveniently accesses across multiple platforms (e.g., AR, VR, desktop, etc.) independent of the user's geolocation in the real world.

Allows users to bring in 2D and 3D data from a storage space into various review modes.

As described, the solution provides a way to browse, navigate, and interact with 3D model data by leveraging 2D floorplans (e.g., REVIT SHEETS). The user is provided with tools and options to pin-point a location using a 2D floor plan on a virtual desk and use that information to precisely teleport into the doll-house model in one-to-one scale mode. Users are allowed to hide and unhide part of the floorplans and perform concurrent changes in the 3D model as presented at the doll-house view at the table-top review model.

Different concurrent scales of design review can be allowed across different realities. For example, a group of users can be around a virtual table, while another group can be inside an architectural model, and they can communicate with each other through a virtual, two-way screen or a spatial portal.

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor. Each processor 612 is capable of processing instructions stored on the computer readable medium 616 or on a storage device such as one of the additional devices 614. The data processing apparatus 600 uses the communication interface 618 to communicate with one or more computers 690, for example, over the network 680. Examples of user interface devices 620 include a display, a camera, a speaker, a microphone, a tactile feedback device, a keyboard, a mouse, and VR and/or AR equipment. The data processing apparatus 600 can store instructions that implement operations associated with the program(s) described above, for example, on the computer readable medium 616 or one or more additional devices 614, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as a hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that produces an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing, and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other units suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors, executing one or more computer programs to perform functions by operating on input data and generating output. The processes and logic flows can also be performed by, and apparatus can also be implemented as, special purpose logic circuitry, e.g., a field programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read-only memory or a random access memory, or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media, and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a liquid crystal display (LCD) device, an organic light emitting diode (OLED) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other, and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface, through which a user can interact with an implementation of the subject matter described in this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A computer-implemented method comprising:
displaying, in an extended reality (XR) environment of an interconnected cross-review collaboration application, a shared three-dimensional (3D) model in a first spatial review mode, wherein the first spatial review mode includes presentation of both two-dimensional (2D) and three-dimensional (3D) data of the 3D model;
receiving, in the XR environment of the interconnected cross-review collaboration application and by a first user, an indication specifying a first location within the shared 3D model, the indication being defined using either the 2D data or the 3D data associated with the 3D model; and
displaying, in the XR environment of the interconnected cross-review collaboration application, a portion of the 3D model in a second one-to-one scale review mode, the portion of the 3D model being displayed from a perspective associated with the specified first location, wherein the first spatial review mode and the second one-to-one scale review mode are interconnected to present at least a portion of the 3D data of the 3D model with different perspectives.

2. The method of claim 1, comprising:
displaying, in a user interface of a display device of a remote user, the shared 3D model in the first spatial review mode as live-streaming from the XR environment of the interconnected cross-review collaboration application.

3. The method of claim 2, comprising:
visualizing an avatar associated with the remote user within the XR environment of the interconnected cross-review collaboration application to form a virtual world that includes the first spatial review mode as a first representation of the 3D model, wherein the first representation is a representation of a shell structure of the 3D model from the outside.

4. The method of claim 1, wherein the 3D model is obtained from a cloud storage shared with multiple users authorized to access and download the 2D and 3D data of the 3D model.

5. The method of claim 1, comprising:
displaying the portion of the 3D model in the second one-to-one scale review mode within a virtual environment interface of a first user to interact with the portion of the 3D model; and
displaying a virtual display screen within the virtual environment interface of the first user to stream a view of the 3D model in the first spatial review mode, wherein the first spatial review mode is presented in a common virtual environment for a set of users interacting with the 3D model via VR devices.

6. The method of claim 1, comprising:
interconnecting the XR environment of the interconnected cross-review collaboration application as a first XR environment displayed to one or more users that joined through use of VR devices with another, second XR environment of the interconnected cross-review collaboration application displayed to one or more users that had joined the second XR environment through devices including VR and AR devices.

7. The method of claim 6, wherein the first XR environment and the second XR environment are interconnected through devices including audio devices, wherein the second XR environment of the interconnected cross-review collaboration application is provided with live streaming on a virtual and audio content from the first XR environment.

8. The method of claim 1, comprising:
generating a virtual world presented in respective interfaces of users, wherein each interface comprises a VR environment for one or more first users, an AR environment for one or more second users, or a non-VR-or-AR environment.

9. The method of claim 8, wherein the virtual world provides at least one of tools, interactive options, and/or command interpretation logic to allows users to visualize one or more review modes of the 3D model, and wherein the virtual world receives interactions from one or more users with 2D data and/or 3D data represented in one or more respective interfaces, wherein the data is interacted with to perform operations comprising navigation, modification, adjustment, and searching within stored data for the 3D model at the interconnected cross-review collaboration application or at a storage space associated with the interconnected cross-review collaboration application.

10. A system comprising:
a non-transitory storage medium having instructions of an interconnected cross-review collaboration application stored thereon; and
one or more data processing apparatus configured to run the instructions of the interconnected cross-review collaboration application to perform operations comprising:
displaying, in an extended reality (XR) environment of the interconnected cross-review collaboration application, a shared three-dimensional (3D) model in a first spatial review mode, wherein the first spatial review mode includes presentation of both two-dimensional (2D) and three-dimensional (3D) data of the 3D model;
receiving, in the XR environment of the interconnected cross-review collaboration application and by a first user, an indication specifying a first location within the shared 3D model, the indication being defined using either the 2D data or the 3D data associated with the 3D model; and
displaying, in the XR environment of the interconnected cross-review collaboration application, a portion of the 3D model in a second one-to-one scale review mode, the portion of the 3D model being displayed from a perspective associated with the specified first location, wherein the first spatial review mode and the second one-to-one scale review mode are interconnected to present at least a portion of the 3D data of the 3D model with different perspectives.

11. The system of claim 10, wherein the non-transitory storage medium comprises instructions of the interconnected cross-review collaboration application, which when run by the one or more data processing apparatus perform operations comprising:
displaying, in a user interface of a display device of a remote user, the shared 3D model in the first spatial review mode as live-streaming from the XR environment of the interconnected cross-review collaboration application.

12. The system of claim 11, wherein the non-transitory storage medium comprises instructions of the interconnected cross-review collaboration application, which when run by the one or more data processing apparatus perform operations comprising:
visualizing an avatar associated with the remote user within the XR environment of the interconnected cross-review collaboration application to form a virtual world that includes the first spatial review mode as a first representation of the 3D model, wherein the first representation is a representation of a shell structure of the 3D model from the outside.

13. The system of claim 10, wherein the non-transitory storage medium comprises instructions of the interconnected cross-review collaboration application, which when run by the one or more data processing apparatus perform operations comprising:
displaying the portion of the 3D model in the second one-to-one scale review mode within a virtual environment interface of a first user to interact with the portion of the 3D model; and
displaying a virtual display screen within the virtual environment interface of the first user to stream a view of the 3D model in the first spatial review mode, wherein the first spatial review mode is presented in a common virtual environment for a set of users interacting with the 3D model via VR devices.

14. The system of claim 10, wherein the non-transitory storage medium comprises instructions of the interconnected cross-review collaboration application, which when run by the one or more data processing apparatus perform operations comprising:
interconnecting the XR environment of the interconnected cross-review collaboration application as a first XR environment displayed to one or more users that joined through use of VR devices with another, second XR environment of the interconnected cross-review collaboration application displayed to one or more users that had joined the second XR environment through devices including VR and AR devices.

15. The system of claim 14, wherein the first XR environment and the second XR environment are interconnected through devices including audio devices, wherein the second XR environment of the interconnected cross-review collaboration application is provided with live streaming on a virtual and audio content from the first XR environment.

16. The system of claim 10, wherein the non-transitory storage medium comprises instructions of the interconnected cross-review collaboration application, which when run by the one or more data processing apparatus perform operations comprising:
generating a virtual world presented in respective interfaces of users, wherein each interface comprises a VR environment for one or more first users, an AR environment for one or more second users, or a non-VR-or-AR environment.

17. The system of claim 16, wherein the virtual world provides at least one of tools, interactive options, and/or command interpretation logic to allows users to visualize one or more review modes of the 3D model, and wherein the virtual world receives interactions from one or more users with 2D data and/or 3D data represented in one or more respective interfaces, wherein the data is interacted with to perform operations comprising navigation, modification, adjustment, and searching within stored data for the 3D model at the interconnected cross-review collaboration application or at a storage space associated with the interconnected cross-review collaboration application.

18. A non-transitory computer-readable medium encoding a program operable to cause one or more data processing apparatus to perform operations comprising:

displaying, in an extended reality (XR) environment of an interconnected cross-review collaboration application, a shared three-dimensional (3D) model in a first spatial review mode, wherein the first spatial review mode includes presentation of both two-dimensional (2D) and three-dimensional (3D) data of the 3D model;

receiving, in the XR environment of the interconnected cross-review collaboration application and by a first user, an indication specifying a first location within the shared 3D model, the indication being defined using either the 2D data or the 3D data associated with the 3D model; and displaying, in the XR environment of the interconnected cross-review collaboration application, a portion of the 3D model in a second one-to-one scale review mode, the portion of the 3D model being displayed from a perspective associated with the specified first location, wherein the first spatial review mode and the second one-to-one scale review mode are interconnected to present at least a portion of the 3D data of the 3D model with different perspectives.

19. The non-transitory computer-readable medium of claim 18, the operations comprising:

displaying, in a user interface of a display device of a remote user, the shared 3D model in the first spatial review mode as live-streaming from the XR environment of the interconnected cross-review collaboration application.

* * * * *